(12) United States Patent
Crane

(10) Patent No.: US 6,991,428 B2
(45) Date of Patent: Jan. 31, 2006

(54) FAN BLADE PLATFORM FEATURE FOR IMPROVED BLADE-OFF PERFORMANCE

(75) Inventor: Nathan Brad Crane, Cambridge, MA (US)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/461,520

(22) Filed: Jun. 12, 2003

(65) Prior Publication Data

US 2004/0253110 A1   Dec. 16, 2004

(51) Int. Cl.
    *F01D 21/00* (2006.01)
(52) U.S. Cl. ...................................... 416/2; 416/193 A
(58) Field of Classification Search ................ 416/2, 416/193 A, 248, 219 R, 220 R; 415/9
    See application file for complete search history.

(56) References Cited

U.S. PATENT DOCUMENTS

| | | | |
|---|---|---|---|
| 3,923,420 A | 12/1975 | Chifos | |
| 4,019,832 A * | 4/1977 | Salemme et al. | 416/193 A |
| 4,688,992 A | 8/1987 | Kirpatrick et al. | |
| 4,917,574 A * | 4/1990 | Dodd et al. | 416/193 A |
| 5,108,261 A * | 4/1992 | Ress et al. | 416/193 A |
| 5,263,823 A | 11/1993 | Cabaret et al. | |
| 5,271,718 A * | 12/1993 | Mitchell et al. | 416/193 A |
| 5,277,548 A * | 1/1994 | Klein et al. | 416/193 A |
| 5,281,096 A | 1/1994 | Harris et al. | |
| 5,375,978 A | 12/1994 | Evans et al. | |
| 5,443,365 A | 8/1995 | Ingling et al. | |
| 5,662,458 A | 9/1997 | Owen | |
| 5,700,133 A * | 12/1997 | Surdi | 416/248 |
| 5,836,744 A | 11/1998 | Zipps et al. | |
| 5,853,286 A * | 12/1998 | Bussonnet et al. | 416/193 A |
| 6,033,185 A | 3/2000 | Lammas et al. | |
| 6,071,077 A | 6/2000 | Rowlands | |
| 6,146,099 A | 11/2000 | Zipps et al. | |
| 6,158,962 A | 12/2000 | Lee et al. | |
| 6,190,133 B1 | 2/2001 | Ress, Jr. et al. | |
| 6,217,283 B1 | 4/2001 | Ravenhall et al. | |
| 6,290,465 B1 | 9/2001 | Lammas et al. | |
| 6,338,611 B1 | 1/2002 | Anderson et al. | |

FOREIGN PATENT DOCUMENTS

GB          701263 A  * 12/1953

* cited by examiner

*Primary Examiner*—Christopher Verdier
(74) *Attorney, Agent, or Firm*—Bachman & LaPointe, P.C.

(57) ABSTRACT

A fan blade for a gas turbine engine having an airfoil with a leading edge; a trailing edge; a concave side; and a convex side. The blade has an integral platform with: a convex fillet merging with the airfoil; a forward edge; an aft edge; and a thickness defined between a top surface and an underside surface. The platform includes a stiffener on the underside surface adjacent the convex side of the blade, such that the stiffener defines a blade-off event platform fracture path on a second side of the platform adjacent the following blade and adjacent the convex side of the airfoil.

6 Claims, 5 Drawing Sheets

FAN BLADE PLATFORM FEATURE FOR IMPROVED BLADE-OFF PERFORMANCE

TECHNICAL FIELD

The invention relates to a method of and apparatus for reducing strain in a following fan blade of a gas turbine engine during impact with a dislodged fan blade during a blade-off event.

BACKGROUND OF THE ART

In a gas turbine engine, a significant safety concern is the fracture of fan blades during engine operation, that due to the high speed of rotation and relatively large mass represent a significant safety hazard as fragments are expelled at high velocity under centrifugal force. The fan casing surrounding the array of fan blades includes containment layers of energy absorbing material to absorb the impact and contain the liberated blade fragments. So called "Fan blade off events" can be caused by foreign object damage such as ingestion of birds or may be due to failure of the fan blade material.

During fracture of a fan blade, usually in the attachment fillet area joining an integral blade platform, the released fracture blade moves tangentially outwardly and collides with the following blade which continues rotation. The integral blade platform slides along the concave surface of the following blade and the platform is fractured as it progresses towards the containment layers of the fan casing. The trajectory of the fractured blade and the integral platform in particular poses the threat of substantial impact damage to the leading edge and the trailing edge of the following blade. The present invention relates to reducing the impact damage and applied loads which threaten the integrity of the trailing edge of the following blade.

As the fractured blade platform disintegrates on impact, the path of fracture of the platform often creates a curved edge that protrudes outwardly towards the trailing edge of the following blade. This curved platform fracture path creates a condition which increases the concentration of the impact force applied to the trailing edge of the following blade, thereby increasing strain in the material and increasing the likelihood of material failure originating from fractures in the relatively thin trailing edge of the following blade.

The prior art has proposed various solutions in an attempt to minimize the damage to the following blade resulting from impact with a fracture blade.

For example, U.S. Pat. No. 5,443,365 shifts the blade platform toward the following blade side of the airfoil in an attempt to permit the released blade platform to make sliding contact with the following blade that deforms and straightens the following blade to distribute impact loads more uniformly.

U.S. Pat. No. 5,836,744 to Zipps et al. provides a frangible blade platform having a groove in the platform to initiate platform fracture and a notched corner of the platform to reduce the impact strain.

On the other hand, U.S. Pat. No. 6,338,611 to Anderson et al. provides a blade platform that has been contoured to more closely match the contour of the airfoil section and thereby reduce the localization of strain induced by impact.

Disadvantages of the above prior art systems include increasing the weight of the blade significantly, increasing manufacturing costs and reducing the reliability of seals between platforms, and increasing difficulty of assembly due to increased manufacturing complexity.

It is an object of the present invention to provide the means to reduce the strain in a following fan blade during impact while having minimal effect on the overall weight of the blade and minimal increase in manufacturing cost and complexity.

Further objects of the invention will be apparent from review of the disclosure, drawings and description of the invention below.

DISCLOSURE OF THE INVENTION

The invention provides a method of and apparatus for reducing localized strains at the trailing edge of a following fan blade of a gas turbine engine during impact with a dislodged fan blade during a blade-off event, by providing a stiffener on the underside surface of the fan blade platform adjacent the convex side of each blade, to control and define a platform fracture pat on the following side of the platform adjacent the convex side of the airfoil. The shape of the fracture path is controlled by stiffening the platform in selected locations to eliminate sharp changes in curvature that have in the prior art resulted in high local stresses and strains when the fractured blade platform collides with the trailing edge of the following blade during a blade-off event.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
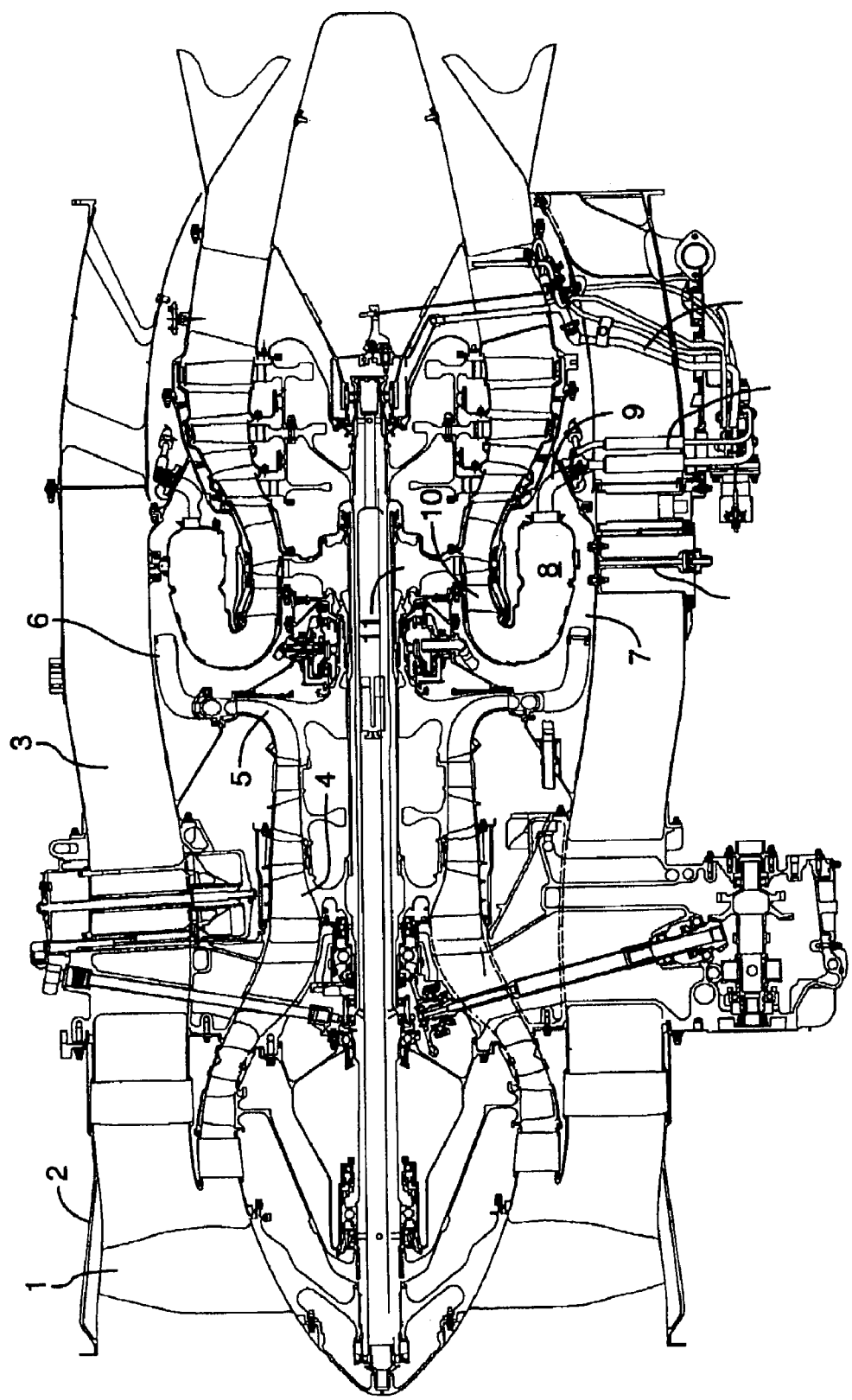
FIG. 1 is an axial cross-section view through a turbofan gas turbine engine showing general layout of the conventional components and in particular showing a fan rotor with fan blades to which the example provided herein is directed.

FIG. 1 shows an axial cross-section through a typical turbofan gas turbine engine. It will be understood however that the invention is applicable to any type of machine having a fan. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust. It will be understood that the foregoing description is intended to be exemplary of only one of many possible configurations of engine suitable for incorporation of the present invention.

Figure 2:
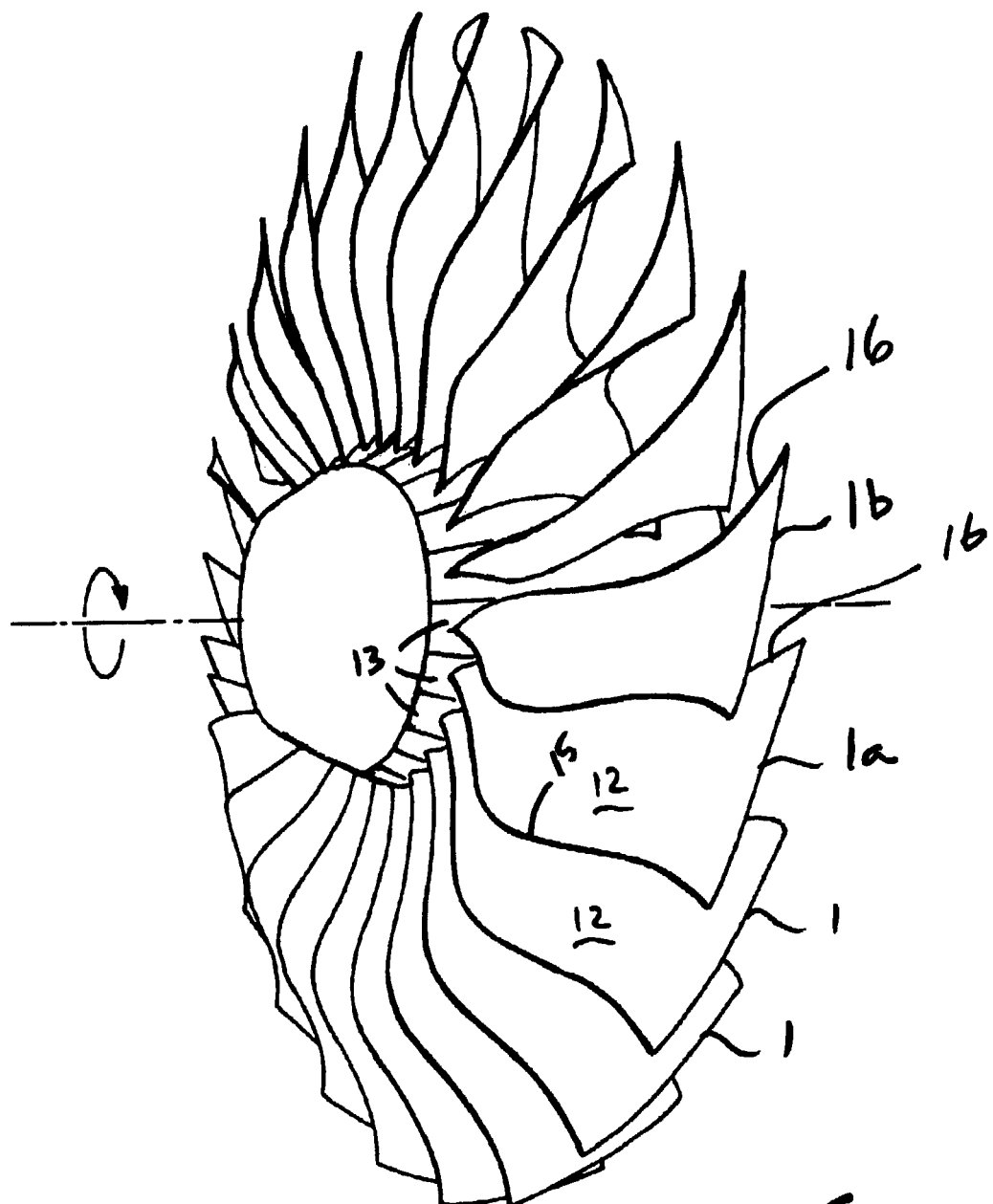
FIG. 2 is a perspective view of a fan rotor with a circumferential array of removable fan blades having a forward swept profile and blade platforms. The invention is also applicable to fan blades without a forward swept profile.
Figure 3:
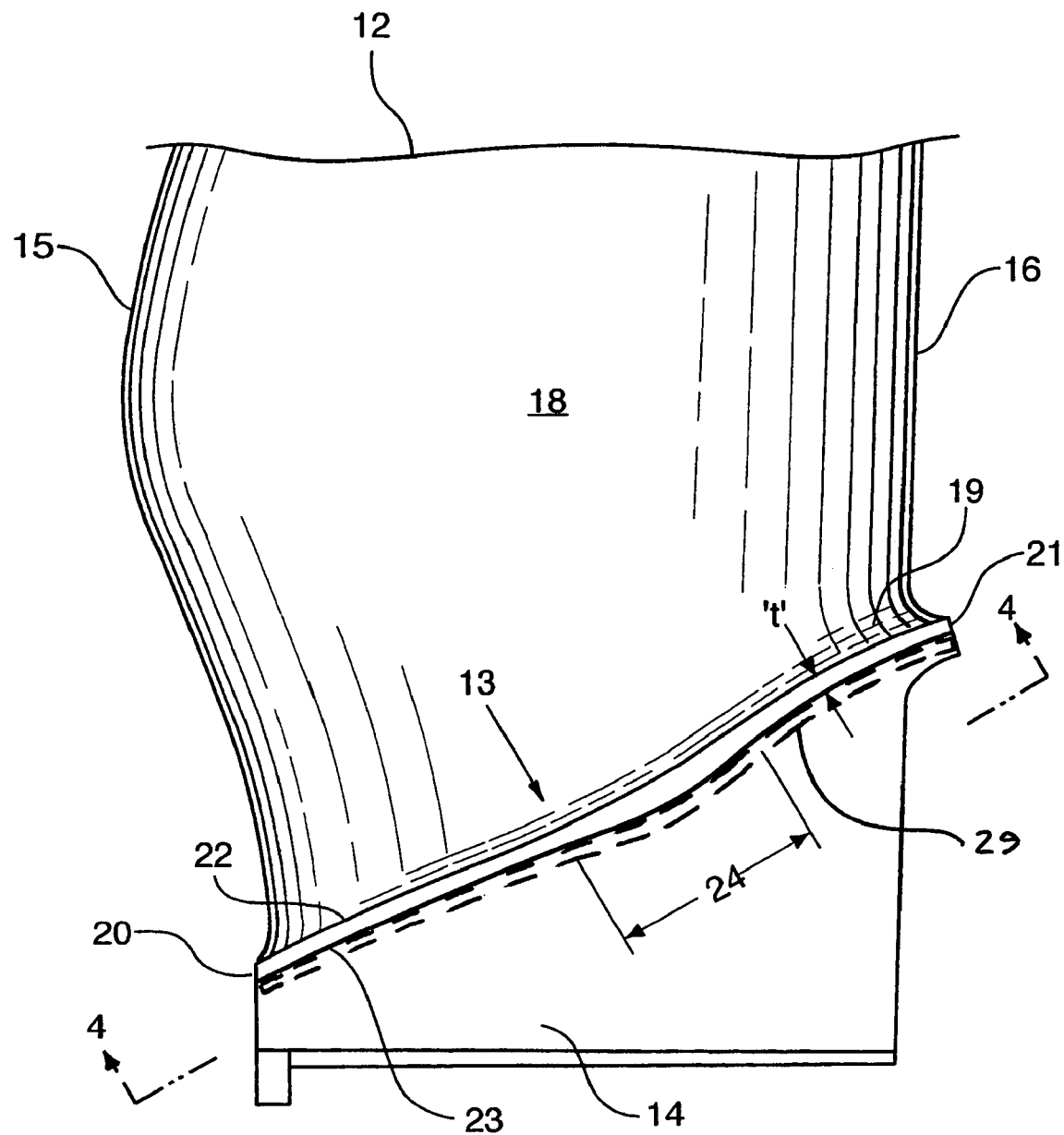
FIG. 3 is an axial side view through a blade root, integral blade platform and the inner portion of a blade airfoil, in particular showing a local increase in thickness of the blade platform comprising a stiffener which serves to define the fracture path of the platform.
Figure 4:
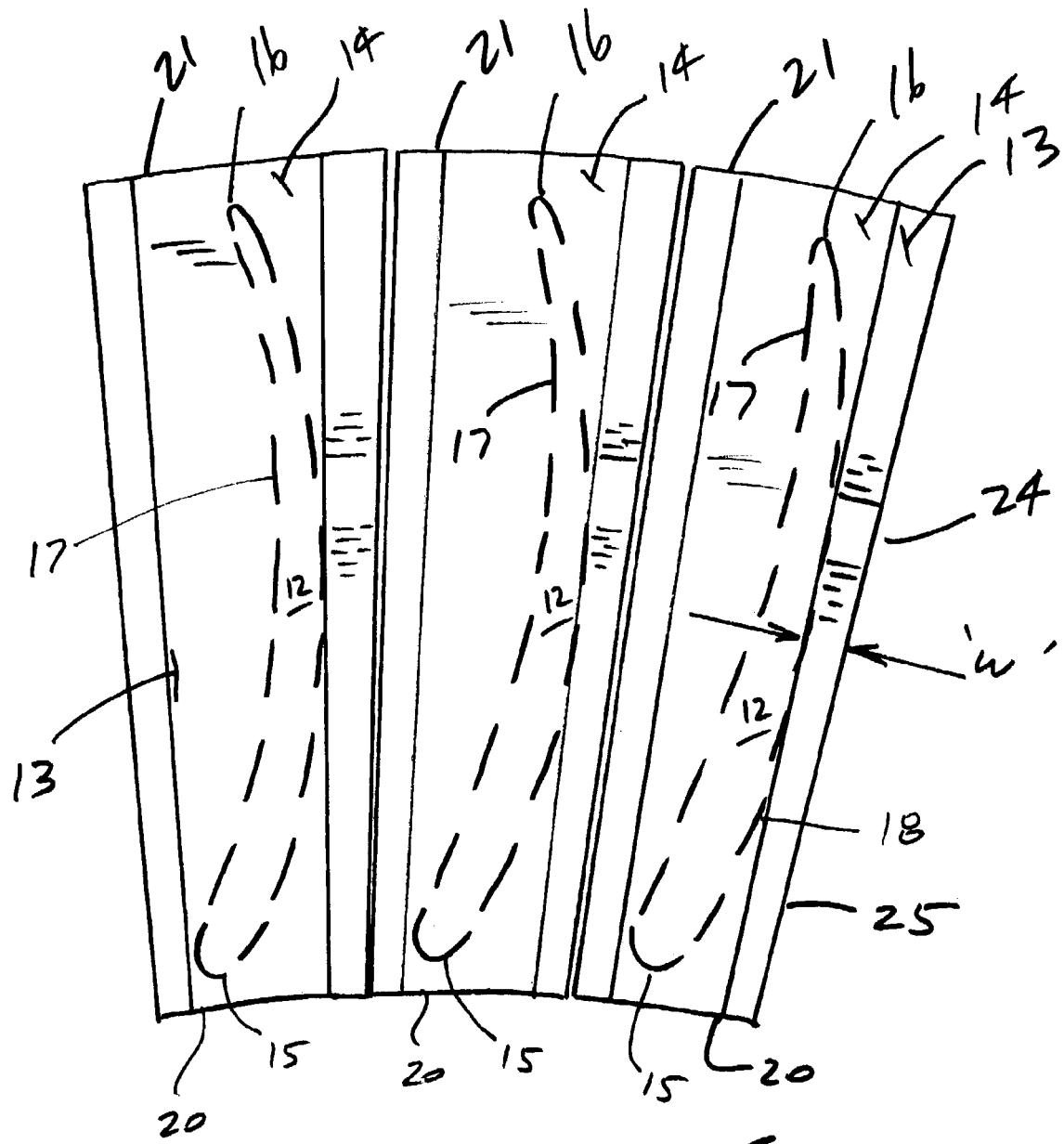
FIG. 4 is an underside view of the blade platforms indicated by line 4—4 in FIG. 3.

FIG. 2 illustrates a fan rotor including a circumferential array of fan blades 1 each having an air foil 12 and a blade platform 13. The platform defines the inner boundary of the air flow path. Seals may be provided to prevent air from passing between adjacent blade platforms 13. As shown in FIG. 3, the blade 1 includes a blade root 14 for mounting in the fan hub in a known manner (not shown). The airfoil 12 has a leading edge 15, which may be swept forward as illustrated and a trailing edge 16. As shown in FIG. 4, the airfoil 12 has a concave pressure side 17 and a convex suction side 18.

As best seen in FIG. 3, the integral platform 18 includes a convex fillet 19 that merges arcuately with the airfoil 12. The platform 18 has a forward edge 20, an aft edge 21 and a thickness "t" defined between a top surface 22 and an underside surface 23. The thickness "t" may vary along the platform both axially and circumferentially.

In order to guide the formation of the platform fracture path during breakup of the platform 13, during a blade off event when the platform 13 collides against the following airfoil 12, the platform 13 includes a stiffener 24 on the underside surface 23 adjacent to the convex side 18 of the blades airfoil 12.

In the embodiment shown, the stiffener 24 comprises an increase in the platform thickness "t" progressing in a downstream direction from the forward edge 20 towards the aft edge 21. In the particular embodiment illustrated the stiffener 24 has a subsequent decrease in the platform thickness t progressing further in the downstream direction to form a localized reinforcing rib or hump in the area indicated in FIGS. 3 and 4. However, it will be understood that the thickness t of the platform 3 may gradually increase to a maximum at the aft edge 21, forming a wedge shaped platform profile, if necessary to further reinforce the downstream portion of the platform 13 and thereby define the platform fracture path to a greater degree.

It is expected that in many cases the added weight required to form a wedge shaped or tapered platform is unnecessary. Significant control over the fracture path is provided with minimal weight addition using a local bump or localized thickening in a form of a stiffener 24 which merely increases the thickness t of the platform 13 in the critical area described below and illustrated in FIGS. 3 and 4. The stiffener 24 from a structural point of view comprises a reinforcing rib that extends from the underside surface 23 in a direction transverse to the convex side 18 of the airfoil 12. As best seen in FIG. 4, it has been determined that in many cases minimal addition of material and weight can be achieved by providing the stiffener 24 in the form of a reinforcing rib that is located immediately downstream from a point with minimal platform dimension "W" measured between the fillet 19 and the following side 25 of the platform 13. It will be apparent that various means to reinforce the platform 13 with various stiffeners is of course possible, however the preferred embodiment provides a reinforcing rib 24 that arcuately smoothly merges with the platform underside surface 23. This type of reinforcement adds minimally to the weight of the platform 13, involves almost no cost during manufacture. Further the smooth or gradual increase and decrease in platform thickness t permits the conformance of an adhered platform underside seal 29. The stiffener 24 has smooth surfaces which reduce stress concentration and avoid the possibility of major mechanical interference with the trailing edge 16 as the fractured surface of the platform 13 slides across the concave side 17 of the following airfoil 12. Other alternative embodiments might use multiple stiffening ribs or locate the beginning of the stiffening rib forward of the point with minimal dimension "w".

Figure 6:
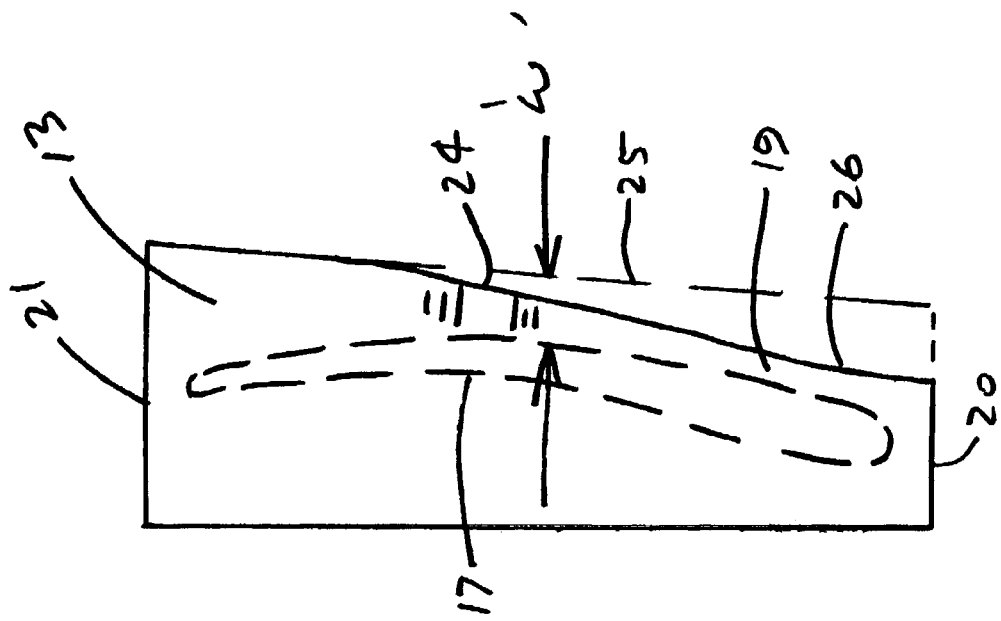
FIG. 6 is a like underside view of the fracture path of a stiffened blade platform in accordance with the invention illustrating in comparison with FIG. 5, the reduced curvature as a result of local platform stiffening.
Figure 5:
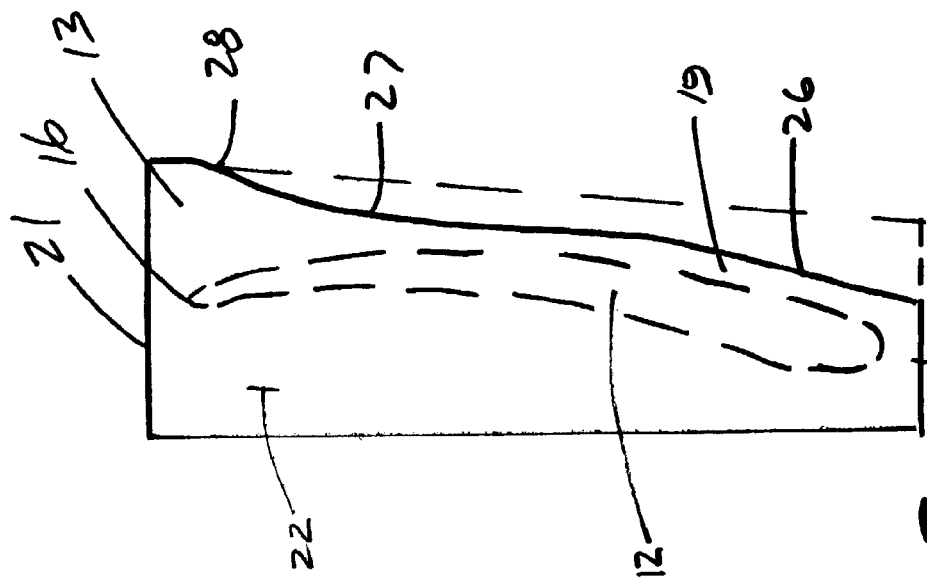
FIG. 5 is an underside view of a fractured prior art blade platform showing relatively sharp curvature especially towards the aft or trailing edge of the platform.

The fracture paths 26 that result from providing a stiffener 24 are illustrated in a comparison between the fracture paths 26 shown in FIGS. 5 and 6. FIG. 5 shows a conventional platform 13 which has a fracture path 26 commencing at the forward edge 20 and follows roughly the edge of the fillet 19 that arcuately merges between the airfoil 12 and the top surface 22 of the platform 13. It has been found that at a point approximately ⅔ the distance between the forward edge 20 and the aft edge 21, the fracture path 26 deviates from the fillet 19, reverses curvature and creates a concave portion 27 terminating in a relatively sharp edge 28 reversing curvature again and propagating towards the termination at the aft edge 21. It has been found that impact with the sharp edge 28 on the trailing edge 16 of the following blade 1b creates a high localized swain tat may lead to creation of fracture cracks and eventual failure of the following blade 1b. This occurs because the trailing edge 16 of the following blade 1b conforms to the shape of the fractured path 26 of the impacting platform 13 of the released blade 1a.

In contrast FIG. 6 shows a blade platform 13 which has been reinforced with a stiffener 24 at a point downstream from the minimum platform dimension "w" between the fillet 19 and the following side 25 of the platform 13. In FIG. 6, it can be seen that initially the fracture path 26 at the forward edge 20 proceeds to follow the fillet 19 until after passing the point of minimum dimension "w". The reinforcing effect of the stiffener 24 serves to direct or define the platform fracture path 26 in a manner that reduces the absolute value of curvature of the fracture path 26 providing a smoother path 26 with less concave curvature, reduction in the rate of change of curvature of the fracture path 26 and reduction in the inversion of curvature. In the prior art example of FIG. 5, a distinctively concave portion 27 and sharp edge 28 is formed when curvature of the fracture path reverses and changes at a relatively rapid rate.

The modified fracture path 26 as illustrated in FIG. 6, more closely follows the shape of the concave side 17 surface of the following airfoil 12 and does not include the formation of a distinct sharp edge 28 or corner. As a result, the impact with the following airfoil 12 does not result in the same degree of strain concentration and potential damage to the trailing edge of the following blade.

Therefore, an apparently small change in the profile of the contacting fracture path 26 has been found to result in a significant change in the strain imposed by impact between the fractured path 26 of the platform 13 and the trailing edge of the following blade airfoil 12.

The impact of a fractured platform 13 with modified fracture path 26 has been found to result in peak strain not located on the trailing edge as in the prior art but rather located inboard of the trailing edge away from the relatively thin trailing edge. As a result, the modified fracture path 26 results in distribution of the principal strain across a greater region of the following airfoil 12. Further, the modified fracture path 26 shifts the primary load or principal strain into a thicker region of the following airfoil 12 away from the relatively thin trailing edge 16 thereby distributing the impact force over a larger area, reducing the maximum principal stress and the resulting strain deformation imposed as a result of impact.

The present invention therefore works by changing the shape of the fracture path 26 of the platform 13 that impacts with the trailing edge 16 of the following airfoil 12. A comparison between the prior art fracture path 26 shown in FIG. 5 and the fracture path 26 which results from the provision of a simple stiffener 24 in FIG. 6 reveals a more uniform smoothly curved fracture path 26. When the modified fracture path 26 of the platform 13 collides with and applies the impact load across a larger region of the following blade airfoil 12 at a thicker portion away from the relatively thin trailing edge 16 of the following airfoil, a reduced level of strain results. Creation of a more uniformed edge of the fracture path 26 is accomplished by local stiffening with the reinforcing rib 24 disposed adjacent to the convex side 18 of the airfoil 12 shortly downstream of the point, indicated with dimension "w", where the airfoil 12 to platform 13 fillet 19 on the convex side 18 of the airfoil 12 is closest to the following side 25 edge of the platform 13.

The preferred embodiment illustrated results in minimal weight increase by providing a stiffener 24 that represents a very localized increase in the thickness "t" of the platform 13 in a specific area. It is in this area where crack propagation of the fracture path 26 in the prior art deviates significantly and results in formation of a concave portion 27 and a relatively sharp edge 28. It will be apparent however, that thickening of the entire platform 13 downstream of dimension w may achieve a similar result depending on the specific geometries of the components, however at an increase in platform weight and possibly adding complexity to the sealing arrangement between adjacent platforms. Further, discrete stiffening ribs or other stiffening mechanisms maybe used however since the fracture path 26 of the platform 13 collides with and slides along the concave side 17 of the following blade, any significant discontinuity caused by discrete ribs or lack of smoothly merging features may create localized stress concentrations on impact. The advantage of the embodiment illustrated is that it has a very small impact on the overall weight and virtually no impact on manufacturing cost since the reinforcing stiffener 24 can be easily machined into the platform 13 without additional fixtures or manufacturing operations. The reinforcing rib 24 simply changes the fracture path 26 (as indicated in a comparison between FIG. 5 and FIG. 6) with very little change in manufacturing procedure and overall weight. The gradual increase and gradual decrease in thickness "tin" of the platform 13 also permits a conventional platform seal arrangement with an inexpensive rubber seal adhered to the underside surface 23 of the platforms 13. The platform seal therefore is not exposed to significant airflow since as indicated in FIG. 4, a minimal gap is provided between adjacent segmental platforms 13.

In contrast to the prior art, the present invention provides minimal weight impact, negligible manufacturing costs, imposes no change in the assembly of the blades 1 to the fan rotor, and does not significantly effect the reliability of platforms seals.

Although the above description relates to a specific preferred embodiment as presently contemplated by the inventor, it will be understood that the invention in its broad aspect includes mechanical and functional equivalents of the elements described herein.

I claim:

1. A method of reducing failure of a following fan blade of a gas turbine engine during impact with a dislodged fan blade during a blade-off event, each fan blade comprising: an airfoil having: a leading edge; a trailing edge; a concave side; and a convex side; and an integral platform formed with the airfoil as a single piece and having: a convex fillet merging with the airfoil; a forward edge; an aft edge; and a thickness defined between a top surface and an underside surface;

the method comprising:
    defining a platform fracture path on a side of platform adjacent the convex side of the airfoil, wherein the path includes a single stiffening member on the underside surface adjacent the convex side of each blade extending transversely from the convex side of the airfoil.

2. A method according to claim 1 wherein the stiffener reduces an absolute value of a curvature of the platform fracture path.

3. A method according to claim 2 wherein the stiffener reduces convex curvature of the platform fracture path.

4. A method according to claim 2 wherein the stiffener reduces a rate of change of curvature of the platform fracture path.

5. A method according to claim 4 wherein the stiffener reduces an inversion of curvature of the platform fracture path.

6. A method according to claim 1 wherein the stiffener comprises an increase in the platform thickness progressing in a downstream direction from the forward edge to the aft edge.

* * * * *